United States Patent Office 3,081,302
Patented Mar. 12, 1963

3,081,302
CERTAIN-p-ACETAMINOPHENOXYACETAMIDO DERIVATIVES
Seymour L. Shapiro, Hastings-on-Hudson, Louis Freedman, Bronxville, and Harold Soloway, New Rochelle, N.Y., assignors to U.S. Vitamin & Pharmaceutical Corporation, New York, N.Y., a corporation of Delaware
No Drawing. Filed Mar. 3, 1961, Ser. No. 93,264
7 Claims. (Cl. 260—247.2)

This invention concerns p-acetaminophenoxyacetamido derivatives and particularly those compounds of the following formula:

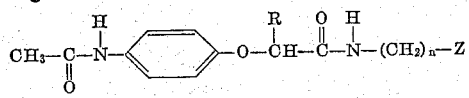

wherein R is an alkyl group having from one to four carbon atoms, n is an integer from two to five, preferably two or three, and Z is a substituent selected from the group consisting of hydroxyl, dialkylamino having from two to eight carbon atoms, morpholino, piperidino and pyrrolidino.

The compounds of this invention have pharmacological activity and are especially useful as agents which, on oral administration, lower blood cholesterol levels.

While compounds are derived from p-hydroxy acetanilide which is a clinically useful analgesic agent (Goodman and Gilman, The Pharmacological Basis of Therapeutics, second edition, Macmillan Co., New York, 1955, pages 311–316), it is of interest that none of the compounds herein described which were evaluated for analgesic activity, showed such a response when inspected at one-third of their $LD_{min}$.

Additionally, the novel amides of this invention are distinct from the described p-acetaminophenoxyacetic acid in that the latter, upon inspection for hypocholesteremic effect, on oral administration, is substantially inactive.

When Z is a substituted amino group, the compounds are desirably employed in the form of their salts with the nontoxic mineral acids and organic acids. Quaternary salts also can be prepared by reation with the lower alkyl halides, tosylates and sulfates, as for example, methyl iodide, ethyl bromoacetate, allyl bromide, butyl tosylate.

Additionally, it will be noted that the R-bearing carbon is asymmetric, and accordingly, optically active forms of the amides of this invention may be obtained through procedures familiar to those skilled in the art. It is, therefore, within the purview of this invention to prepare the d and l forms of the compounds in addition to the dl forms herein described.

For the preparation of the compounds, the most convenient route involves the reaction of p-hydroxy acetanilide with an α-haloester of the formula such as RHBrCOOEt in acetone under reflux, employing potassium carbonate as an acid binder. After a suitable reflux period under vigorous stirring, quenching the reaction mixture and work-up afford the desired intermediate reactant ester of the formula:

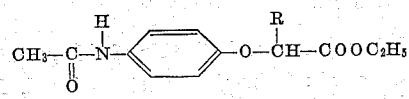

While the ethyl esters are herein formed, the nature of the ester is not critical and can be methyl or propyl, and the like. The use of ethyl esters here reflects the commercial accessibility of the ethyl esters of the α-halo acids.

Additionally, while α-bromo esters were herein employed α-chloro or α-iodo esters may be used as initial reactants. The ester so formed, upon reflux with the amine

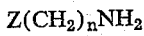

gives the desired compounds.

Alternatively, the ethyl ester can be converted to the free acid by hydrolysis and this, in turn, can be isolated and reacted with the $Z(CH_2)_nNH_2$ to give the products.

Additionally, the free acid can be converted to the acid chloride and this reacted with the amines described above to give the products.

To evaluate the hypocholesteremic property of the compounds of this application, normal adult guinea pigs and rats were given subcutaneous doses of the test compounds at the beginning of the experiment, 24 hours later, and finally, 48 hours later.

Blood samples were drawn for the determination of serum cholesterol levels at the initiation of the experiment and at the following time intervals thereafter: 6, 48, and 72 hours.

The $LD_{min}$ indicates the dose which is lethal to mice when the compound is administered subcutaneously and is expressed in mg./kg. The dose is the dosage of the drug administered subcutaneously expressed mg./kg. under the schedule described above and the effect of the compound in reducing cholesterol is indicated by the percent reduction from the cholesterol level noted for the animal at the initiation of the experiment.

Thus, if at the initiation of the experiment the noted cholesterol was 80 mg. percent and at a subsequent interval, the noted cholesterol was 60 mg. percent, this would be shown as a 25% reduction.

In particular, the importance of the compounds of this application is enhanced by the noted retention of hypocholesteremic activity upon oral administration. As an example, the compound of Example 3 showed an $LD_{min}$ of >1000 mg./kg.—and in guinea pigs, at 30 mg./kg. s.c. after 72 hours, had reduced cholesterol levels 46%, and at 60 mg./kg. p.o., had reduced cholesterol 31%.

The following are illustrative examples characteristic of, but not limiting the scope of this invention.

EXAMPLE A

*Ethyl α-(4-Acetaminophenoxy)Propionate*

A mixture of 60.4 g. (0.4 mole) of p-hydroxyacetanilide, 72.4 g. (0.4 mole) of ethyl α-bromopropionate, 55.2 g. (0.4 mole) of potassium carbonate and 300 mls. of acetone was heated under reflux with stirring for 12 hours. The mixture was then filtered, the solvent evaporated and the residue treated with aqueous potassium carbonate. The resulting oil was separated, and the aqueous phase extracted three times with chloroform. After combining the oil and chloroform layers, drying (anhydrous magnesium sulfate) and removing the solvent, distillation gave 48.8 g. (61%) of product, boiling at 186–192° at 0.03 mm.

*Analysis.*—Calcd. for $C_{13}H_{17}NO_4$: C, 62.1; H, 6.8; N, 5.6. Found: C, 62.4; H, 7.0; N, 5.7.

EXAMPLE B

*Ethyl α-(4-Acetaminophenoxy)Butyrate*

A mixture of 30.2 g. (0.2 mole) of p-hydroxyacetanilide, 39.0 g. (0.2 mole) of ethyl α-bromobutyrate, 27.6 g. (0.2 mole) of potassium carbonate and 150 mls. of acetone was refluxed with stirring for 10 hours. At the end of this period, the solid was filtered, the solvent removed from the filtrate, and solid and residue combined and suspended in ether. This suspension was then washed with 5% aqueous sodium carbonate and with water. After drying (anhydrous magnesium sulfate) and removal of solvent, distillation gave 30 g. (57%)

of product, boiling at 182–184° at 0.1 mm. and solidifying after standing.

*Analysis.*—Calcd. for C₁₄H₁₉NO₄: C, 63.4; H, 7.2; N, 5.3. Found C, 63.1; H, 7.3; N, 5.7.

Similarly, there is prepared ethyl α-(4-acetaminophenoxy)-valerate and ethyl α-(4-acetaminophenoxy)-hexanoate.

EXAMPLE 1

N-(2-Diethylaminoethyl)-α-(Acetaminophenoxy)-Propionamide

Ethyl α-(4-acetaminophenoxy)propionate (7.0 g., 0.02 mole), 16.2 g. (0.14 mole) of 2-diethylaminoethylamine and 0.5 ml. of 25% sodium methylate in methanol were placed in a flask fitted with a 10 cm. fractionating column and distilling head. The solution was then heated at an internal temperature of 140° for 9 hours, after which the temperature was raised to 160° to distil out the ethanol which had been formed. After repeating this heating and distillation procedure, the excess amine was removed at diminished pressure and the residue triturated with dry ether to give a solid, melting at 90–120°, which on recrystallization (acetonitrile) yielded 4.0 g. (44%) of product, melting at 126–129°.

*Analysis.*—Calcd. for C₁₇H₂₇N₃O₃: C, 63.5; H, 8.5; N, 13.1. Found: C, 63.8; H, 8.4; N, 12.8.

In a similar manner, using 2-(4-morpholino)ethyl amine there is obtained N-(2-[4-morpholino]ethyl)-α-(4-acetaminophenoxy)propionamide, use of piperidinoethyl amine gives N-(2-piperidinoethyl)-α-(4-acetaminophenoxy)-propionamide.

Salts such as the nicotinic acid, or quinolinic acid salts are prepared from equivalent quantities of these acids and the above-described bases.

EXAMPLE 2

N-(2-Hydroxyethyl)-α-(4-Acetaminophenoxy)-Propionamide

The title compound was prepared by the procedure of Example 1, using 7.0 g. (0.028 mole) of ethyl-α-(4-acetaminophenoxy)-propionate, 8.5 g. (0.14 mole) of 2-aminoethanol and 0.5 ml. of 25% methanolic sodium methylate. Recrystallization of the crude product first from acetone, then from acetonitrile gave 1.0 g. (13%) of product, melting at 149–153°.

*Analysis.*—Calcd. for C₁₃H₁₈N₂O₄: C, 58.6; H, 6.8; N, 10.5. Found: C, 58.9; H, 6.8; N, 10.9.

EXAMPLE 3

N-(2-Diethylaminoethyl)-α-(4-Acetaminophenoxy)-Butyramide

The title compound was prepared by the procedure of Example 1, using 6.9 g. (0.026 mole) of ethyl α-(4-acetaminophenoxy)-butyrate, 15.1 g. (0.13 mole) of 2-diethylaminoethylamine and 0.5 ml. of 25% methanolic sodium methylate. Trituration with dry ether gave 4.3 g. (50%) of product, melting slowly up to 118°, which was recrystallized from acetone, then water to yield 0.9 g. (10%) of product, melting at 126–128°.

*Analysis.*—Calcd. for C₁₈H₂₉N₃O₃: C, 64.5; H, 8.7; N, 12.5. Found: C, 64.6; H, 8.8; N, 12.8.

In a similar manner, from 3-aminopropanol there is obtained N-(3-hydroxypropyl)-α-(4-acetaminophenoxy)-butyramide; use of dimethylaminopropylamine affords N-(3-dimethylamino propyl)-α-(4-acetaminophenoxy)-butyramide; pyrrolidinopropylamine yields N-(3-pyrrolidinopropyl)-α-(4-acetaminophenoxy)-butyramide.

These compounds, as well as their salts, can thus be used as medicaments in the form of pharmaceutical preparations which contain the compound, or a salt thereof, in admixture with a pharmaceutical organic or inorganic solid or liquid carrier suitable for oral or parenteral administration.

For making these preparations, substances are used which do not react with the new compounds of this application. For example, water, gelatin, lactose, starches, magnesium stearate, talc, vegetable oil, benzyl alcohols gums, polyalkylene glycols, petroleum jelly or other known carriers for medicaments may be used.

The pharmaceutical preparations may be made up, for example, as tablets or in a liquid form as solutions, suspensions or emulsions which also may be capsulated.

If desired, the pharmaceutical forms of the compounds of this invention may be sterilized or may contain auxiliary substances such as buffering agents, stabilizing agents, wetting agents or emulsifying agents. They may also contain other therapeutically active substances. The preparations are made up by the usual methods.

Depending on the dosage regimen desired and the weight and hypercholesteremic state of the patient, the unit dose may vary from 25 to 300 mg. per dose which may be given singly or in divided doses.

It is to be understood that it is intended to cover all changes and modifications of the examples of the invention herein chosen for the purpose of illustration which do not constitute departures from the spirit and scope of the invention.

We claim:

1. The compound

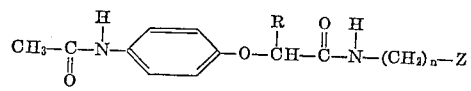

wherein R is alkyl of one to four carbon atoms, *n* is an integer from two to five and Z is a substituent selected from the group consisting of hydroxyl, dialkylamino having from two to eight carbon atoms, morpholino, piperidino and pyrrolidino.

2. The compound

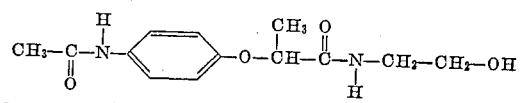

3. The compound

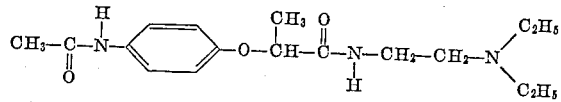

4. The compound

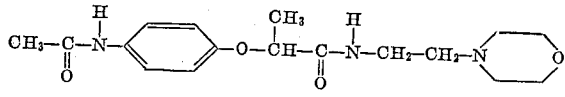

5. The compound

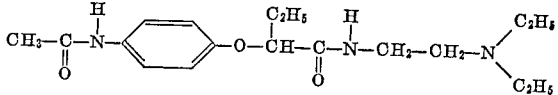

6. The compound

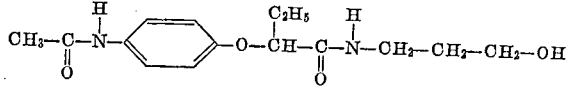

7. A compound as in claim 1 wherein *n* is an integer from two to three.

References Cited in the file of this patent

Kurihara et al.: "Chemical Abstracts," vol. 53, page 10, 141 (1959).